(12) United States Patent
Wilson et al.

(10) Patent No.: US 10,184,450 B2
(45) Date of Patent: Jan. 22, 2019

(54) METHOD FOR OPERATING A WIND TURBINE BASED ON DEGRADATION OF WIND TURBINE BLADE

(71) Applicant: Envision Energy (Jiangsu) Co. Ltd., Jiangyin (CN)

(72) Inventors: Kitchener Clark Wilson, Santa Barbara, CA (US); Feng Zhang, Houston, TX (US); Lin Chen, Shanghai (CN); Yuping Sun, Pearland, TX (US)

(73) Assignee: Envision Energy (Jiangsu) Co., Ltd., Jiangyin (CN)

( * ) Notice: Subject to any disclaimer, the term of this patent is extended or adjusted under 35 U.S.C. 154(b) by 448 days.

(21) Appl. No.: 15/138,303

(22) Filed: Apr. 26, 2016

(65) Prior Publication Data

US 2016/0312767 A1 Oct. 27, 2016

(30) Foreign Application Priority Data

Apr. 27, 2015 (WO) .................. PCT/IB2015/001448
Dec. 29, 2015 (DK) .................................. 2015 70888

(51) Int. Cl.
*F03D 7/04* (2006.01)
*F03D 17/00* (2016.01)
(Continued)

(52) U.S. Cl.
CPC ............ *F03D 7/044* (2013.01); *F03D 7/0224* (2013.01); *F03D 7/046* (2013.01); *F03D 9/25* (2016.05);
(Continued)

(58) Field of Classification Search
CPC ........ F03D 7/044; F03D 7/046; F03D 7/0224; F03D 9/25; F03D 80/40; F03D 17/00; F05B 2270/20; F05B 2270/336; Y02E 10/723

See application file for complete search history.

(56) References Cited

U.S. PATENT DOCUMENTS 5,481,648 A * 1/1996 Volponi .................... F01D 7/00
706/45
5,652,485 A * 7/1997 Spiegel ................ F03D 7/0272
318/147

(Continued)

FOREIGN PATENT DOCUMENTS

CN 102648345 A 8/2012
CN 102678452 A 9/2012
(Continued)

*Primary Examiner* — Igor Kershteyn
(74) *Attorney, Agent, or Firm* — James Creighton Wray

(57) ABSTRACT

A control method and a wind turbine for adaptively adjusting the operation of the wind turbine to maintain maximum power production during degraded conditions. The control system has an estimator module that determines a scaling factor based on the current set of control signals and at least the current set of measurement of the operating parameters. The scaling factor is transmitted to a control module which scales at least one aerodynamic property of the rotor based on this scaling factor. The control module further determines the ideal settings for the control signals based on the scaled aerodynamic properties. The present control method scales the aerodynamic properties to provide a better representation of the actual degraded aerodynamic properties.

15 Claims, 12 Drawing Sheets

(51) Int. Cl.
*F03D 7/02* (2006.01)
*F03D 9/00* (2016.01)
*F03D 9/25* (2016.01)
*F03D 80/40* (2016.01)

(52) U.S. Cl.
CPC .............. *F03D 17/00* (2016.05); *F03D 80/40* (2016.05); *F05B 2270/20* (2013.01); *F05B 2270/336* (2013.01); *Y02E 10/723* (2013.01)

(56) References Cited

U.S. PATENT DOCUMENTS

| | | | |
|---|---|---|---|
| 5,748,500 A | | 5/1998 | Quentin et al. |
| 5,806,052 A | * | 9/1998 | Bonissone ......... G05B 13/0275 |
| | | | 706/1 |
| 5,914,537 A | * | 6/1999 | Zaviska .................. F01K 13/02 |
| | | | 290/40 R |
| 8,174,136 B2 | | 5/2012 | Johnson et al. |
| 8,319,364 B2 | | 11/2012 | Nakayama |
| 8,405,239 B2 | | 3/2013 | Hashimoto et al. |
| 8,924,162 B2 | | 12/2014 | Lapira et al. |
| 8,941,253 B2 | | 1/2015 | Christiansen et al. |
| 2011/0004356 A1 | * | 1/2011 | Garcia .................. F03D 7/0284 |
| | | | 700/287 |
| 2011/0081226 A1 | * | 4/2011 | Wobben ................ F03D 7/0264 |
| | | | 415/1 |
| 2011/0241343 A1 | * | 10/2011 | Petter .................... F03D 7/0256 |
| | | | 290/44 |
| 2012/0076651 A1 | * | 3/2012 | Laurberg .................. F03D 7/02 |
| | | | 416/1 |
| 2012/0211986 A1 | * | 8/2012 | Bertolotti ................ F03D 7/042 |
| | | | 290/44 |
| 2012/0301296 A1 | * | 11/2012 | Greenblatt .......... H04L 65/1053 |
| | | | 416/1 |
| 2013/0264823 A1 | | 10/2013 | Christiansen |
| 2014/0241878 A1 | | 8/2014 | Herrig et al. |
| 2015/0005966 A1 | | 1/2015 | Gerber et al. |

FOREIGN PATENT DOCUMENTS

| | | |
|---|---|---|
| CN | 102859184 A | 1/2013 |
| CN | 103026059 A | 4/2013 |
| CN | 103362738 A | 10/2013 |
| EP | 2559894 A1 | 2/2013 |
| EP | 2818698 A1 | 12/2014 |
| WO | 2014/170443 A1 | 10/2014 |

* cited by examiner

METHOD FOR OPERATING A WIND TURBINE BASED ON DEGRADATION OF WIND TURBINE BLADE

BACKGROUND OF THE INVENTION

Field of the Invention

The present invention relates to an operation method and a wind turbine configured to determine aerodynamic changes in the wind turbine blades due to ageing and degradation by environmental conditions, and to adapt the control method based on these changes.

Description of Related Art

It is known that rain, sand, dust, and other wind-born debris gradually chip and erode the critical leading edge of the fast moving wind turbine blades. Also, salt, pollution and sticky dust particles will accumulate on the outer surface adding weight and roughness to the wind turbine blade, thereby altering the aerodynamically shaped outer surfaces until rain or a maintenance wash cleans them off. Furthermore, ice can accumulate on the leading edges if the air contains droplets of super-cooled water, and lightning strikes may form cracks anywhere along the wind turbine blade despite that the wind turbine blade is outfitted with electrically conductive elements. Ageing affects the finish of the outer surface and the leading edge, thus altering their original shape and form. Any of these conditions may degrade the carefully designed aerodynamic profile of the wind turbine blade, therefore the wind turbine blade need to be cleaned and repaired to maintain the aerodynamic performance. Since the damage and aerodynamic degradation are primarily concentrated at the leading edges, special materials have to be applied to repair and protect the leading edges of the wind turbine blades, however servicing the blades is dangerous work as the tower is typically 90 meters high and subjected to wind gusts. Blade repair and other maintenance works are only occasionally performed as this work is expensive and adds to the downtime of the wind turbine.

The control systems of such wind turbines are typically tuned according to nominal aerodynamic specifications, where deviations from these nominal specifications cause the control system to de-tune and reduce the power production. This problem may be solved by tuning the control system according to partially degraded aerodynamic specifications in an effort to avoid control system misstep under heavy degradation, and to buffer the power production. However, the wind turbine is not operated optimally prior to the degradation and is not able to compensate for the progressive change of the aerodynamics occurring beyond these partially degraded specifications.

U.S. Pat. No. 8,405,239 B2 suggests using three different linear time domain models one for each operation range. A temporal variation table is generated for each operation range and compared to a current control parameter of the drive system. If the current control parameter deviates from the table value by more than 20%, then the control parameter is adjusted. It is stated that this allows the control system to compensate for changes in the dynamics of the drive system due to ageing. However, the teachings do not hint how the control system is re-tuned or how this control parameter should be adjusted. Furthermore, this solution does hint that the control system is able to detect the degradation of the blade aerodynamics.

U.S. Pat. No. 8,174,136 B2 discloses a maximum power point determination scheme based on an adaptive method for controlling the pitch and torque combined with a determination of a power coefficient. The power coefficient is determined over a time period as the ratio between the captured power and the available wind power. The pitch control signal or torque control signal is incrementally stepped by an increment value according to the changing power coefficient. The increment value is added to the current pitch control signal and, if the power coefficient is increased, the process is repeated. If the power coefficient is decreased, the increment value is negated and the process is repeated. In a similar manner, another increment value may be added to the current torque control signal.

It is stated that this solution allows the wind turbine to increase the power production at wind speeds below the rated wind speed. The averaged power is determined based on wind speeds measured by an anemometer. However, such an anemometer mounted on the wind turbine does not measure the actual wind speed, but the downstream wind speed after it has been significantly affected by the rotor. Large wind turbines have a rotor covering a great area, e.g., 7854 square meters [$m^2$] for a rotor with rotor blades of 50 meters, thus the wind speed measured at a single anemometer position does not provide representative value of the wind speed impacting the entire rotor.

U.S. Patent Application Publication 2014/0241878 A1 discloses a method for monitoring the aerodynamic condition of the wind turbine blades. One or more sensors are arranged in example on the wind turbine blades or on the wind turbine tower for sensing one or more operating parameters of the wind turbine. A control unit analyses the received sensor data to determine the roughness state of the outer surface of the wind turbine blades. The control unit then adapts the pitch angle or rotor speed to compensate for the loss of the overall wind turbine performance. However, the teachings are silent about how the sensor data is analysed and how the pitch angle or rotor speed is adapted based on these sensor data.

U.S. Patent Application Publication 2015/0005966 A1 discloses a wind turbine control method, wherein a first scaling factor is calculated based on stored load conditions and a correction parameter is calculated based on measured operating conditions. The correction parameter is then used to calculate a second scaling factor, which is multiplied with the first scaling factor to determine a corrective action used to adjust the performance of the wind turbine. The purpose of this control method is to ensure that the design loads are not exceeded by monitoring the actual mechanical loading conditions and adapting the power output accordingly. This control method is not designed to monitor the extent of the aerodynamic degradation of the wind turbine blades, nor is it provides an effective control method for compensating for the changing aerodynamic properties of the wind turbine blades.

Therefore, there is a need for a method for monitoring the blade aerodynamic degradation, estimating when maintenance is needed, and adapting the wind turbine control according to the changing blade aerodynamics to maximize the power/energy production.

SUMMARY OF THE INVENTION

An object of the invention is to provide a method for monitoring the degradation of the blade aerodynamics of a wind turbine and determine the extent of this degradation.

An object of the invention is to provide a method for adapting the operation of the wind turbine based on the extent of the aerodynamic degradation.

An object of the invention is to provide a wind turbine that allows the aerodynamics degradation of the wind turbine blades to be monitored.

An object of the invention is to provide a wind turbine that allows the power production to be optimized based on the extent of the aerodynamic degradation.

An object of the invention is achieved by a method for controlling the operation of a wind turbine, the wind turbine comprises at least two pitchable wind turbine blades rotary connected to an electrical generator, the method comprises the steps of:

operating the wind turbine to produce an electrical power output by means of one or more control signals, measuring one or more operating parameters of the wind turbine, determining a degradation value based on the measured one or more operating parameters, where the degradation value is indicative of the aerodynamic degradation of the wind turbine blades, adapting the operation of the wind turbine for maximizing the power output by adjusting at least one of the control signals based on the degradation value, wherein the step of adjusting at least one of the control signals comprises scaling at least one control parameter based on a scaling factor defining the degradation value, where this control parameter is indicative of the aerodynamic properties of the wind turbine blades in a normal, i.e., undegraded, state.

This provides an adaptive control method that allows the operation of the wind turbine to be re-tuned to compensate for the impacts of the aerodynamic degradation of the wind turbine blades. This control method adjusts the normal or ideal aerodynamic properties so they provide a better representation of the actual degraded aerodynamic properties. The ideal aerodynamic properties are scaled towards the actual degraded aerodynamic properties based on a scaling factor. This allows the wind turbine to optimize or maximize power production, even when the aerodynamics are degraded due to ageing, blade wear, accumulated particles or ice, or other conditions. The terms "degraded" and "dirty" used herein refer to any situation in which the aerodynamic properties deviate from the ideal aerodynamic properties. The terms "normal", "ideal" and "clean" used herein refer to the aerodynamic properties determined during or after manufacturing.

An estimator module in the control system determines the scaling factor based on measurements carried out on or relative to the wind turbine. The scaling factor and/or other information indicative of the extent of the aerodynamic degradation are optionally transmitted and displayed to an operator at a remote location. The scaling factor may also be used to estimate the next maintenance or service period where an alarm alerts the operator when the maintenance or service period is due. The scaling factor may be a numerical value or a multi-dimensional vector, e.g., a vector as function of the wind speed, the tip speed ratio, and/or the pitch angle.

According to one embodiment, the control parameter is selected from at least one of the following: an aerodynamic power coefficient, an aerodynamic thrust coefficient, an aerodynamic torque coefficient, an aerodynamic induction factor, or a radius of the rotor.

The aerodynamic properties of an ideal and clean wind turbine blade are determined before erecting the wind turbine, e.g., through wind tunnels tests, while the degraded aerodynamic properties of a degraded or dirty wind turbine blade are determined by using various measurements as mentioned above. The ideal and/or degraded aerodynamic properties may be determined as a look-up table, e.g., using linear interpolation between adjacent table values. This allows for a more accurate optimization of the power production, because the control signals are selected based on an adapted aerodynamic profile instead of an ideal or partially degraded aerodynamic profile.

The aerodynamic properties are defined by the size and shape of the wind turbine blades. The rotor radius, the aerodynamic power coefficient, the aerodynamic thrust coefficient, the aerodynamic torque coefficient, the aerodynamic induction factor, and other relevant control parameters may be used to define the aerodynamic properties. One or more scaling factors may be applied individually or collectively to one or more of these control parameters.

The values of the control signals of the control system in the wind turbine are optimized according to a maximum power scheme captured by the wind:

$$\{\Omega_{opt}(V, \rho), \beta_{opt}(V, \rho)\} = \max_{\Omega, \beta}\left\{P_{opt} = \frac{1}{2} \cdot \rho \cdot \pi \cdot R^3 \cdot V^2 \cdot \Omega \cdot C_q\left(\frac{R \cdot \Omega}{V}, \beta\right)\Big|_{\substack{P \leq P_{rated} \\ \beta_{min} \leq \beta \\ \Omega \leq \Omega_{rated}}}\right\} \quad (1)$$

where $\rho$ is the air density, R is the radius of the rotor, V is the wind speed, $\Omega$ is the rotational speed of the rotor, $\beta$ is the pitch angle, and $C_q$ is the aerodynamic torque coefficient. The optimized torque, $q_{opt}$, used to rotate the rotor and the optimized thrust force, $f_{opt}$, acting on the rotor can be determined as:

$$q_{opt}(V, \rho) = \frac{1}{2} \cdot \rho \cdot \pi \cdot R^3 \cdot V^2 \cdot C_q\left(\frac{R \cdot \Omega_{opt}}{V}, \beta_{opt}\right) \quad (2)$$

$$f_{opt}(V, \rho) = \frac{1}{2} \cdot \rho \cdot \pi \cdot R^2 \cdot V^2 \cdot C_t\left(\frac{R \cdot \Omega_{opt}}{V}, \beta_{opt}\right)$$

where $C_t$ is the aerodynamic thrust coefficient, $\Omega_{opt}$ is the optimized rotation speed of the rotor, and $\beta_{opt}$ is the optimized pitch angle. Furthermore, the aerodynamic power coefficient, $C_p$, can be determined as $C_p = \lambda \cdot C_q$ where $\lambda$ is the tip speed ratio.

One or more of the control signals are normally subjected to one or more restrictions, such as the captured power must not exceed the rated power setting, the rotation speed must not exceed the maximum allowable operation speed, and the loads in the wind turbine structure must not exceed the maximum acceptable factice loads. Also, the pitch angle is subjected to some constraints due to inequalities at the lower end of the pitching range and optional upper limit of the pitching range. Therefore, the various optimized solutions for the control signals may be determined relative to a given wind speed and/or air density in real-time or according to a look-up table which in turn is used by the control system to control the operation of the wind turbine.

According to a special embodiment, at least two of the aerodynamic power coefficient, aerodynamic thrust coefficient and the aerodynamic torque coefficient are scaled based on a common scaling factor.

Two or more of the ideal control parameters may be scaled by a scaling factor, $k_c$. This allows the different control parameters to be adjusted by the same amount. In example, the scaled aerodynamic thrust coefficient, $C_{t\_scaled}$, and the aerodynamic torque coefficient, $C_{q\_scaled}$, are determined as:

$$C_{q\_scaled\_dirty}(k_C,\lambda,\beta)=k_C \cdot C_{q\_clean}(\lambda,\beta)$$

$$C_{t\_scaled\_dirty}(k_C,\lambda,\beta)=k_C \cdot C_{t\_clean}(\lambda,\beta) \quad (3)$$

where $C_{q\_clean}$ is the ideal aerodynamic torque coefficient, $C_{t\_clean}$ is the ideal aerodynamic thrust coefficient, $C_{q\_scaled}$ is the scaled aerodynamic torque coefficient, and $C_{t\_scaled}$ is the scaled aerodynamic thrust coefficient.

Alternatively or additionally, the radius of the rotor may be scaled by determining a virtual radius utilising a scaling factor, $k_R$, where $R_{virtual}=k_R \cdot R$. This allows the control system to operate the wind turbine as if the rotor were outfitted with a wind turbine blade having a reduced blade length. The scaled aerodynamic thrust coefficient and/or the aerodynamic torque coefficient are then determined based on this virtual rotor radius:

$$C_{q\_scaled\_dirty}(k_R,\lambda,\beta)=k_R^3 \cdot C_{q\_clean}(k_R,\lambda,\beta)$$

$$C_{t\_scaled\_dirty}(k_R,\lambda,\beta)=k_R^2 \cdot C_{t\_clean}(k_R,\lambda,\beta) \quad (4)$$

The aerodynamic power coefficient may be scaled in a similar manner according to equation (3) or (4) as $C_p=\lambda \cdot C_q$. Alternatively or additionally, an individual scaling factor may be determined for one or more of the aerodynamic coefficients $C_t$, $C_q$, $C_p$.

At least one of the aerodynamic coefficients $C_t$, $C_q$, $C_p$ may also be calculated by means of an aerodynamic induction factor. The induction factor represents the change in the upstream wind speed between the free flowing air stream located far away from the rotor and the wind speed located at the rotor. This allows for a more accurate determination of the degraded aerodynamic coefficients, since some of the free flowing air stream is deflected away from the rotor and the downstream air flow has a reduced wind speed.

The ideal induction factor, $a_{clean}$, is then scaled by means of a scaling factor, $k_a$, to replicate the scaled induction factor, $a_{scaled}$, where $a_{scaled}=k_a \cdot a_{clean}$. The scaled aerodynamic thrust coefficient or aerodynamic torque coefficient are determined as:

$$C_{t\_scaled\_dirty}(k_a,\lambda,\beta) = 4 \cdot k_a \cdot a_{clean}(\lambda,\beta) \cdot (1 - k_a \cdot a_{clean}(\lambda,\beta)) \quad (5)$$

$$C_{q\_scaled\_dirty}(k_a,\lambda,\beta) = \frac{4 \cdot k_a \cdot a_{clean}(\lambda,\beta) \cdot (1 - k_a \cdot a_{clean}(\lambda,\beta))^2}{\lambda}$$

The aerodynamic power coefficient may also be determined by using this induction factor in a similar manner according to equation (5) as $C_p=\lambda \cdot C_q$.

The continuous function of equation (5) may alternatively be modified into a piecewise function having at least two line segments. This allows the line segments to form a fully differentiable monotonic function, e.g., a function where a given output value is given by only one input value. One of the line segments may define a tangential line at a predetermined point on the original line of equation (5). The other line segment may define a line segment of the original equation (5).

The scaling of the respective aerodynamic coefficient may be further improved by calculating a ratio of this scaled aerodynamic coefficient to the ideal aerodynamic coefficient. This ratio may then be applied to, e.g., multiplied with, the ideal aerodynamic coefficient to determine an improved scaled aerodynamic coefficient. In example, the aerodynamic torque coefficient is determined as follows:

$$C_{q\_scaled\_dirty}(k_a, \lambda, \beta) = \frac{k_a \cdot a_{clean}(\lambda,\beta) \cdot (1 - k_a \cdot a_{clean}(\lambda,\beta))^2}{a_{clean}(\lambda,\beta) \cdot (1 - a_{clean}(\lambda,\beta))^2} \cdot C_{q\_clean}(\lambda,\beta) \quad (6)$$

The aerodynamic thrust coefficient and/or the aerodynamic power coefficient may be determined in a similar manner where the ratio of the scaled value to the ideal value is multiplied with the ideal value. This allows for a better representation of the actual degraded aerodynamic coefficient.

Any one of the scaling factors described above may be used to adapt the aerodynamic properties to maximize the power production during normal operation. The present control method is particular advantageous for wind speeds between the cut-in wind speed and the rated wind speed. The rated wind speed may be between 7 to 10 m/s. The degraded wind turbine may in these regions be operated at a higher rotation speed, a lower generator torque, and a lower pitch angle to maximize the power production compared to a normal wind turbine.

According to one embodiment, the method further comprises the step of estimating a wind speed acting uniformly on the wind turbine blades.

The estimator module further estimates an effective wind speed that acts uniformly on the entire rotor disc over the swept area and as changes with time. This estimated wind speed is determined using a wind speed estimation algorithm, such as described in U.S. Pat. Nos. 5,289,041 A and 7,317,260 B2, and International Patent Application Publication WO 2009/153614 A2 which are all incorporated by reference into the present application. This allows for a more accurate measurement or estimate of the actual wind speed acting on the rotor compared to the use of an anemometer placed on the nacelle.

According to one embodiment, the step of adapting the operation of the wind turbine comprises adapting at least a pitch control signal or a generator torque control signal based on at least the estimated wind speed or the degradation value.

The estimator module is connected to a control module that scales the control parameters based on the scaling factor and/or the estimated wind speed received from the estimator module. The control module, e.g., an operating point optimizer, determines the optimized operating point for the various control signals so that the wind turbine achieves the maximum power production. The scaled control parameters are used for determining the optimized value of each control signal.

These optimized values for the control signals are then transmitted directly to the various operating units in the wind turbine or to a local control system in the wind turbine. The local control system then in turn transmits these values to the various operating units. In example, the control module, e.g., a pitch controller, uses these optimized values as a set-point for controlling the pitch of the wind turbine blades. The pitching is controlled based on the scaling factor, the estimated wind speed, and the response of the wind turbine, e.g., the measured rotation speed.

According to one embodiment, the step of determining the degradation value comprises predicting a first set of operating parameters based on a current set of control signals and at least a second set of operating parameters.

The estimator module determines in a first embodiment the scaling factor by means of a state estimation algorithm, e.g., a Kalman filter algorithm, a least squared curve fitting, or $H_\infty$ logics. In example, the estimator module uses a first model, e.g., a mathematical state model, to predict the state of the wind turbine based on the current or actual values of the control signals. A second model, e.g., a mathematical model, is used to transform this predicted state into a predicted set of measurements, e.g., the first set of operating parameters. An error between the predicted measurements and the current measurements is further used as input to the first model to correct the next prediction. The first and second models describe a state-space representation of the control system where the behaviour of the wind turbine system may be defined by two known transfer functions. This allows the control system to tract the states and measurements of the wind turbine while predicting the values of the next measurement using the first and second models.

The estimator module determines a time series model of the state vector and the predicted measurement. Using the first and second models described above, the time series model of the wind speed, the scaling factor, and the rotation speed are determined as:

$$\frac{d}{dt}\begin{bmatrix}\Omega\\V\\k\end{bmatrix} = \begin{bmatrix}\frac{1}{2 \cdot I} \cdot \rho \cdot \pi \cdot R^3 \cdot V^2 \cdot C_{q\_scaled\_dirty}(k, \Omega, V, \beta)\\0\\0\end{bmatrix} + \quad (7)$$

$$\begin{bmatrix}\frac{1}{I}\\0\\0\end{bmatrix}q + \begin{bmatrix}0 & 0\\1 & 0\\0 & 1\end{bmatrix} \cdot \begin{bmatrix}\delta_{Vdot}\\\delta_{kdot}\end{bmatrix}$$

$$\Omega^* = \begin{bmatrix}1 & 0 & 0\end{bmatrix}\begin{bmatrix}\Omega\\V\\k\end{bmatrix} + \delta_\Omega$$

where $\delta_{Vdot}$ is a zero mean Gaussian white noise sequence with standard deviation $\sigma_{Vdot}$ in units of wind speed acceleration, and $\delta_{kdot}$ is a zero mean Gaussian white noise sequence with standard deviation $\sigma_{kdot}$ in units of scale factor speed. The general term k refers to any one of the scaling factors $k_c$, $k_R$, $k_a$ described above. Furthermore, I is the total inertia of the rotating components in the drive train, e.g., the rotor, the rotation shaft, the generator, and optionally the gearbox. The startup phase of the rotation shaft is not taken into account in equation (5). The equations (7) may further be linearised, e.g., about the steady state or an earlier state prior to the steady state, using an extended Kalman filter, a particle filter or another linearization technique.

The thrust force acting on the rotor may in example be measured indirectly as function of the position of the wind turbine tower. The thrust force is then calculated based on the measured acceleration of the wind turbine tower. This acceleration may be measured directly by means of accelerometers or indirectly by means of a positioning system, e.g., a global positioning system or a local positioning system, as described later. This improves the prediction process while making the system observable.

In one embodiment, the second set of operating parameters is a current measured set of operating parameters or at least a previous measured set of operating parameters.

The next predicted state and thus next set of measurements is at least based on the current state and thus current set of measurements. This allows for a simplified calculation of the next set of measurements. The prediction of the next state and thus set of measurements may be improved by looking at two or more sets of measurements, e.g., the current set of measurements and at least one previous set of measurements. These at least two sets of measurements may simply be averaged, or be weighted and then summed. This makes the control system less sensitive to noise and large changes in the measurements.

According to another special embodiment, the step of determining the degradation value further comprises determining the deviation between the current measured set of operating parameters and the first set of operating parameters, and correcting a subsequent third set of operating parameters based on this deviation.

The estimator module corrects the next predicted measurements, e.g., the third set operating parameter, based on the deviation between the current measurement and the earlier predicted measurement for that time period. This increases the accuracy of the next prediction and allows the control method to track the trajectory of the control signals.

According to yet another special embodiment, the method comprises the steps of:

calculating a test scaling factor by adding a first scaling factor to a second scaling factor, scaling the at least one control parameter based on the test scaling factor, measuring a first set of operating parameters, evaluating the first set of operating parameters by comparing it to a second set of operating parameters to detect whether at least one of the control parameters in the first set has an improved value over the corresponding control parameter in the second set or not, and if an improvement is detected, then saving the test scaling factor as the second scaling factor, or if no improvement is detected, then negating the value of the first scaling factor.

The terms "improved value" and "improvement" define any conditions that constitute an improved selected control parameter, such as an increase in the power production, a reduction in the loads and/or vibrations in the wind turbine tower or the rotor, or an increase or decrease in the pitch angle and/or the rotation speed.

In this embodiment, the estimator module calculates a test scaling factor by adding a fixed scaling factor to a current scaling factor. This test scaling factor is then transmitted to the control module. The control module scales the respective control parameter based on the received test scaling factor and then determines an optimized value for each of the control signals. A new set of measurements, e.g., the first set of measurements, is then carried out by means of the various sensors arranged on or relative to the wind turbine.

The control module, or an evaluator module, then evaluates this new set of measurements to detect or identify any improvements in at least one of the control parameters, e.g., the power production. This may be done by comparing the newly measured set of control parameters to a previously measured set of control parameters. If an improvement is detected, then the test scaling factor is stored as the new current scaling factor and the new set of measurements are stored as the previous set of measurements. If no improvement is detected, then the current test scaling factor is not changed and the fixed scaling factor is negated, e.g., change from a positive value to a negative value, or vice versa, and the new set of measurements is optionally stored as the previous set of measurements. The process is then repeated at the next time period. This allows for a simple and easy adjustment of the control parameter and thus the operation of the wind turbine, as the current scaling factor is incremented or decremented depending on the measured values of the operating parameters.

The improvement may be determined as a change in a value, e.g., the amplitude or the frequency, of the control parameter that exceeds a predetermined lower threshold value. The lower threshold value may be selected based on the tolerances of the wind turbine system or the noise level in the respective control parameter.

An object of the invention is also achieved by a wind turbine comprising a wind turbine tower, an electrical generator arranged on top of the wind turbine tower, e.g., in a nacelle, a rotor with at least two wind turbine blades rotatably connected to the generator, and a control system configured to control the operation of the wind turbine based on one or more control signals, where the control system is configured to determine a degradation value indicative of the aerodynamic degradation of the wind turbine blades and to adapt the operation of the wind turbine based on this degradation value, wherein the degradation value is a scaling factor and the control system is configured to scale at least one control parameter indicative of the aerodynamic properties of the wind turbine blades in a normal state based on this scaling factor.

This provides an alternative control system for adapting the operation of the wind turbine according to the degradation of the wind turbine blades. This control system allows for a more accurate adjustment of the control signals, as the ideal aerodynamic properties of the wind turbine blades are adjusted so they provide a better representation of the actual degraded aerodynamic properties. This enables the control system to compensate for blade degradation due to ageing, blade wear, ice or other particles accumulated on the wind turbine blades or conditions that will result in a loss of aerodynamic effect.

According to one embodiment, the control system comprises an estimator module configured to predict a first set of operating parameters based on a current set of control signals and at least a second set of operating parameters.

As described above, the estimator module comprises a first model and a second model used to predict the next measured set of operating parameters. The first and second models define a state-space representation of the wind turbine system utilising the control signals and operating parameters to modeling the behavior of the wind turbine system. This allows for a more accurate adaptation of the operation of the wind turbine and allows the control system to track the trajectories of the control signals for degraded wind turbine.

According to one embodiment, the estimator module is further configured to correct a subsequent third set of operating parameters based on a deviation between a current measured set of operating parameters and the first set of operating parameters.

As described above, the estimator module further comprises a comparator used to determine the deviation or error between the predicted set of measurements and the current set of measurements. This deviation or error is used by a corrector to correct the next predicted set of measurements. The estimator module, e.g., the corrector, is configured to calculate the gain used to correct the next predicted set of measurements. The gain is fed back to the first model and/or the second model and used to calculate the next set of measurements and/or the next state of the system. This increases the accuracy of the predicted set of measurements.

According to one embodiment, the control system comprises an estimator module configured to calculate a test scaling factor by adding a first scaling factor to a second scaling factor, wherein the control system is further configured to evaluate a first set of operating parameters relative to a second set of operating parameters to detect whether at least one of the control parameters in the first set has an improved value over the corresponding control parameter in the second set or not.

This provides a simplified control system that allows the value of the test scaling factor to be changed depending on whether the current scaling factor has resulted in an improvement in at least one of the operating parameters, as described above. The estimator module is configured to add a fixed scaling factor to the current scaling factor and to carry out a current measurement using this test scaling factor. The evaluator module is configured to analyse this current measurement and a previous measurement, and further generate a signal indicating whether an improvement has been detected or not which is transmitted to the estimator module. The estimator module is configured to negate the value of the fixed scaling factor if the signal indicates that no improvement is detected. If the signal indicates that an improvement is detected, the estimator module is configured to save the test scaling factor as the current scaling factor. The evaluator module may form part of the control module.

The control system is configured to adapt the operation of the wind turbine periodically at predetermined time periods. The time period may be selected as hours, days or weeks depending on the geolocation of the wind turbine, the age of the wind turbine, or other relevant criteria's. The operating parameters are measured within a predetermined time window. Alternatively, individual time windows may be used to measure the operating parameters where each time window is optimized for the particular type of control parameter. A memory unit connected to the control system is used to store the measurements, the scaling factors and the control signals for each time period/time window.

The control system further comprises a control module configured to adapt the one or more control signals based on the degradation value and an estimated wind speed. As described above, the control module is configured to determine the optimized value for each control signal using an operating point optimizer and/or a pitch controller. The pitch controller may be configured as a PI-controller, a PID-controller, or another suitable controller. The scaling factor and/or the estimated wind speed are used by the pitch controller to calculate one or more gains in the pitch control algorithm.

According to one embodiment, at least one sensor unit is arranged relative to the wind turbine, wherein the least one sensor unit is configured to directly or indirectly measure an acceleration of the wind turbine tower.

As described above, the acceleration of the wind turbine tower can be measured directly by means of one or more accelerometers arranged on the wind turbine, e.g., on the wind turbine tower. The accelerometers are configured to measure the acceleration in the plane defined by the rotation shaft of the rotor. The accelerometers are connected to the control system by means of a wired or wireless connection.

The measured signal from the accelerometer is for example low-pass filtered by the control system by using a filter, e.g., a digital filter, to eliminate the oscillations due to the resonant frequency. The measured signal may be filtered around a centre frequency between 0.05 Hz to 0.15 Hz, e.g., 0.1 Hz. The phase delay of the low-pass filter may be taken into account when calculating the filtered acceleration data. The time series model of these accelerations may be included in the equations (7)

$$\frac{d}{dt}\begin{bmatrix} \Omega \\ V \\ k \\ \ddot{x}_{lowpass} \end{bmatrix} = \begin{bmatrix} \Omega_{dot}(k, \Omega, V, \beta) \\ 0 \\ 0 \\ \omega_{lowpass} \cdot \left(\frac{1}{2 \cdot m} \cdot \rho \cdot \pi \cdot R^2 \cdot V^2 \cdot C_{t\_scaled\_clean}(k, \Omega, V, \beta) - \ddot{x}^*\right) \end{bmatrix} + \quad (8)$$

$$\begin{bmatrix} \frac{1}{I} \\ 0 \\ 0 \\ 0 \end{bmatrix} \cdot q + \begin{bmatrix} 0 & 0 \\ 1 & 0 \\ 0 & 1 \\ 0 & 0 \end{bmatrix} \cdot \begin{bmatrix} \delta_{Vdot} \\ \delta_{kdot} \end{bmatrix}$$

$$\begin{bmatrix} \Omega^* \\ \ddot{x}_{lowpass^*} \end{bmatrix} = \begin{bmatrix} 1 & 0 & 0 & 0 \\ 0 & 0 & 0 & 1 \end{bmatrix} \cdot \begin{bmatrix} \Omega \\ V \\ k \\ \ddot{x}_{lowpass} \end{bmatrix} + \begin{bmatrix} 1 & 0 \\ 0 & 1 \end{bmatrix} \cdot \begin{bmatrix} \delta_\Omega \\ \delta_\alpha \end{bmatrix}$$

where $\omega_{lowpass}$ is the cut-off frequency of the low-pass filter, $\ddot{x}^*$ is the raw acceleration data measured by the accelerometers, $\ddot{x}_{lowpass}$ is the filtered acceleration data measured by the accelerometers, and $\alpha$ is the angle-of-attack.

The acceleration of the wind turbine tower may instead be determined by means of a complex model taken into account the resonant motion of the wind turbine tower:

$$\frac{d}{dt}\begin{bmatrix} \Omega \\ V \\ k \\ \dot{x} \\ x \end{bmatrix} = \begin{bmatrix} \Omega_{dot}(k, \Omega, V, \beta) \\ 0 \\ 0 \\ \frac{1}{2 \cdot m} \cdot \rho \cdot \pi \cdot R^2 \cdot V^2 \cdot C_{t\_scaled\_clean}(k, \Omega, V, \beta) - \omega_{tower}^2 \cdot x - 2 \cdot \xi_{tower} \cdot \omega_{tower} \cdot \dot{x} \\ \dot{x} \end{bmatrix} + \quad (9)$$

$$\begin{bmatrix} \frac{1}{I} \\ 0 \\ 0 \\ 0 \\ 0 \end{bmatrix} \cdot q + \begin{bmatrix} 0 & 0 \\ 1 & 0 \\ 0 & 1 \\ 0 & 0 \\ 0 & 0 \end{bmatrix} \cdot \begin{bmatrix} \delta_{Vdot} \\ \delta_{kdot} \end{bmatrix}$$

where $\omega_{tower}$ is the resonant frequency, $\xi_{tower}$ is the damping ratio, m is the total mass of the nacelle and rotor, and x is the position of the wind turbine tower relative to the rotation axis defined by the rotation shaft.

At least a second sensor is arranged on or relative to the wind turbine for measuring at least a second operating parameter. The second sensor may be configured to measure torque, output power, pitch angle, vibrations, rotation speed, loads or another operating parameter. One or more sensors configured to sense an environmental parameter, such as wind speed, air temperature, air pressure or another environmental parameter, may be connected to the control system. The environmental sensor may be a pressure sensor, a temperature sensor, a LIDAR-system, an anemometer or another suitable sensor or sensor unit. A time series model of these measurements may further be included in the equations (6).

According to a special embodiment, the at least one sensor unit is a position sensor or a tilt sensor.

The above-mentioned tower acceleration can be measured indirectly by means of a positioning position. The acceleration is then calculated as function of the absolute position of the wind turbine tower. The positioning system may be a global positioning system (GPS), e.g., a differential global positioning system (DGPS), or a local positioning system (LPS). The positioning system comprises one or more local receivers located on the wind turbine, e.g., on the rotor, the nacelle, or the wind turbine tower. The local receiver is configured to receive a correction signal, e.g., a RTK signal or another phase carrier enhancement signal, from at least one remote reference unit. The local receiver then corrects its own measurements based on the received correction signal. The remote unit may be a fixed reference station located at a predetermined location, or a base unit arranged on a predetermined position on or relative to the wind turbine. Alternatively, the remote reference unit may be omitted and the correction signal may be transmitted via an Internet based service solution.

In this embodiment, the equations for the first and second model are determined as:

$$\begin{bmatrix} \Omega^* \\ x_{GPS}^* \end{bmatrix} = \begin{bmatrix} 1 & 0 & 0 & 0 & 0 \\ 0 & 0 & 0 & 0 & 1 \end{bmatrix} \cdot \begin{bmatrix} \Omega \\ V \\ k \\ \dot{x} \\ x \end{bmatrix} + \begin{bmatrix} 1 & 0 \\ 0 & 1 \end{bmatrix} \cdot \begin{bmatrix} \delta_\Omega \\ \delta_{x\_GPS} \end{bmatrix} + \begin{bmatrix} 0 \\ x_{null\_GPS} \end{bmatrix} \quad (10)$$

where $x_{null\_GPS}$ is the offset between the GPS sensor measurement and the initial position of the wind turbine tower in which no deflection occurs, and $x_{GPS}$ is the position data from the positioning system.

At least one angular sensor, e.g., a tilt sensor or an inclinometer, is arranged on the wind turbine tower and connected to the control system. The angular sensor is configured to measure the tilting angle of the wind turbine tower relative to its initial position. In this embodiment, the tilting angle, $\gamma$, is determined as:

$$x_{offset} = \frac{h^3}{3 \cdot EI} \cdot F \quad (11)$$

$$\gamma = \frac{h^2}{2 \cdot EI} \cdot F = \frac{3}{2 \cdot h} \cdot x_{offset}$$

where F is the force applied to the wind turbine tower, h is the tower height, EI is the flexural rigidity of the wind turbine tower, and $x_{offset}$ is the offset from the nominal or initial position.

The equations for the first and second models are then determined as:

$$\begin{bmatrix} \Omega^* \\ \gamma^* \end{bmatrix} = \begin{bmatrix} 1 & 0 & 0 & 0 & 0 \\ 0 & 0 & 0 & 0 & \frac{3}{2 \cdot h} \end{bmatrix} \cdot \begin{bmatrix} \Omega \\ V \\ k \\ \dot{x} \\ x \end{bmatrix} + \begin{bmatrix} 1 & 0 \\ 0 & 1 \end{bmatrix} \cdot \begin{bmatrix} \delta_\Omega \\ \delta_\gamma \end{bmatrix} + \begin{bmatrix} 0 \\ \gamma_{null} \end{bmatrix} \quad (12)$$

where $\gamma_{null}$ is the initial or nominal tilting angle of the wind turbine tower.

In practice the turbine tower is not a uniform beam, therefore the relationship between the tilting angle and the position is more complex then indicated above. However, this can be solved by means of a look-up table describing this relationship.

An object of the invention is further achieved by a wind turbine system comprising one or more wind turbines, wherein each wind turbine comprises a local control system configured to control the operation of that wind turbine, where each local control system is configured to communicate remotely with a remote control system, wherein the remote control system is configured to adapt the operation of at least one of the one or more wind turbines based on one or more control signals, where said remote control system is configured to determine a degradation value indicative of the aerodynamic degradation of the wind turbine blades and to adapt the operation of the wind turbine based on this degradation value, wherein the degradation value is a scaling factor and said remote control system is configured to scale at least one control parameter indicative of the aerodynamic properties of the wind turbine blades in an undegraded state based on this scaling factor.

The present control system is implemented into the wind turbine control system located in the wind turbine. Alternatively, the present control system is implemented in a remote control system, e.g., a monitoring system, where the remote control system is in communication with a local wind turbine control system via wireless or wired connection. The wireless connection may be a SCADA data link. This allows the adaptive control of the wind turbine operation to be carried on-site or via a remote location. The measurements carried out by the various sensors may be transmitted to the remote location as raw data which are then processed at the remote location. Alternatively, an initial processing, e.g., filtering, is carried out on the measurements in the wind turbine before transmitting the measurements to the remote location.

The invention is described by example only and with reference to the accompanying drawings.

DETAILED DESCRIPTION OF THE INVENTION

In the following text, the figures will be described one by one and the different parts and positions seen in the figures will be numbered with the same numbers in the different figures. Not all parts and positions indicated in a specific figure will necessarily be discussed together with that figure.

Figure 1:
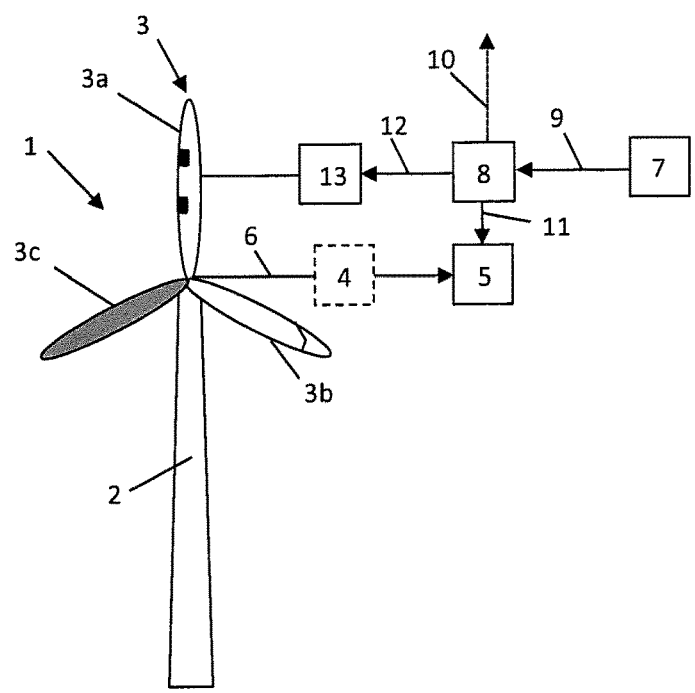
FIG. 1 shows a block diagram of an exemplary wind turbine outfitted with a control system according to the invention.

FIG. 1 shows a block diagram of an exemplary embodiment of a wind turbine 1 outfitted with a control system configured to monitor the aerodynamic degradation and to adapt the wind turbine control accordingly. The wind turbine comprises a wind turbine tower 2 on top of which a nacelle is provided. A rotor with three wind turbine blades 3 is rotatably mounted to the nacelle. The rotor is connected to an optional gearbox 4 and in turn to an electrical generator 5 in the nacelle via at least one rotation shaft 6.

One or more sensors 7 configured to measure one or more operating parameters of the wind turbine 1 are connected to a control system 8 via a wireless or wired connection. The sensors 7 are arranged on or relative to the wind turbine 1 for measuring various operating parameters, such as generator torque, power output, pitch angle, mechanical vibrations or loads, rotation speed of rotor, position of wind turbine tower, acceleration of wind turbine tower movement, or another suitable operating parameter. The sensors 7 may further include at least one environmental sensor for measuring wind speed, air temperature, air pressure, or another suitable environmental parameter.

The control system 8 is configured to monitor the extent of the blade degradation based on the measured operating parameters 9, e.g., the sensor data. The blade degradation may be caused by erosion damages to the leading edge of a wind turbine blade 3a, cracks in the surface of a wind turbine blade 3b due to lightning, or built up of ice on the surface of a wind turbine blade 3c. The control system transmits the information 10 indicative of the blade degradation to a remote location at which an operator is able to monitor the operation of the wind turbine 1. The control system 8 is further configured to adjust at least a generator torque control signal 11 and a pitch control signal 12 according to the measured blade degradation. The generator 5 and the pitch mechanism 13 then adjust the generator torque and pitch angle in accordance with these control signals 11, 12 to maximize the power production under these degraded conditions.

Figure 2:
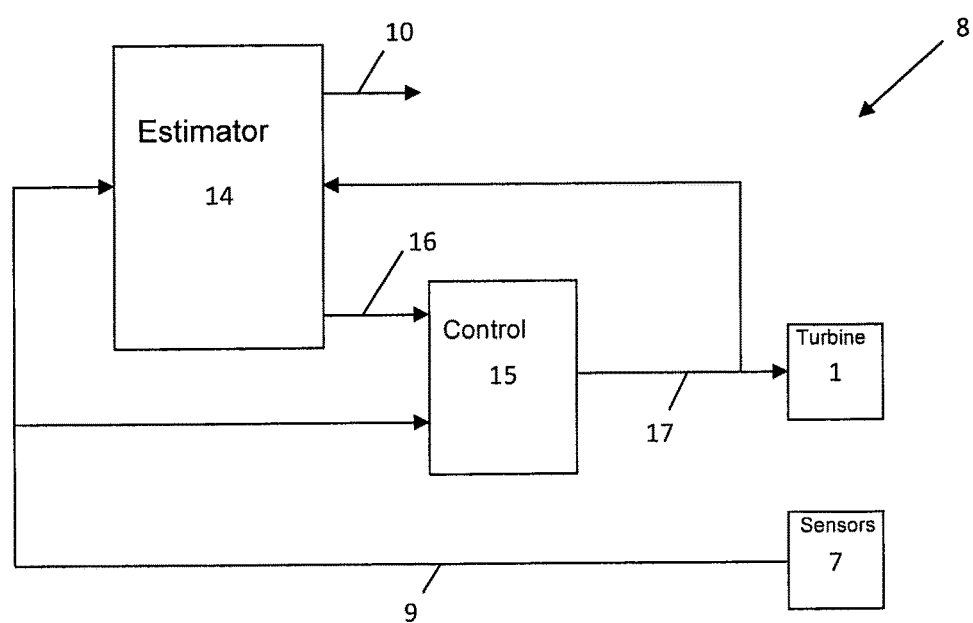
FIG. 2 shows a block diagram of an exemplary embodiment of the control system of FIG. 1 according to the invention.

FIG. 2 shows a block diagram of an exemplary embodiment of the control system 8 according to the invention. The control system 8 comprises an estimator module 14 configured to generate a scaling factor 16 and a control module 15 configured to generate one or more control signals 17 controlling the operation of the wind turbine 1.

The operating parameters 9 measured by the sensors 7 are transmitted to the estimator module 14. The control signals 17 used to control the operation of the wind turbine 1 is further transmitted to the estimator module 14. The estimator module 14 analyzes these data to determine the blade degradation information 10 and generate the scaling factor 16. The blade degradation information 10 includes the scaling factor 16 which is used to alert the operator of the next maintenance period.

One or more of the measured operating parameters 9 is further transmitted to the control module 15 along with the scaling factor 16. The control module 15 is further to scale one or more of the aerodynamic properties of the rotor defined by the wind turbine blades 3 using the received scaling factor 16 to replicate the actual degraded aerodynamic properties. The control module 15 then adapts the control signals 17 based on these scaled aerodynamic properties and transmitted them to the respective components of the wind turbine 1. This reduces the power loss and loads in the wind turbine due to the blade degradation.

Figure 3:
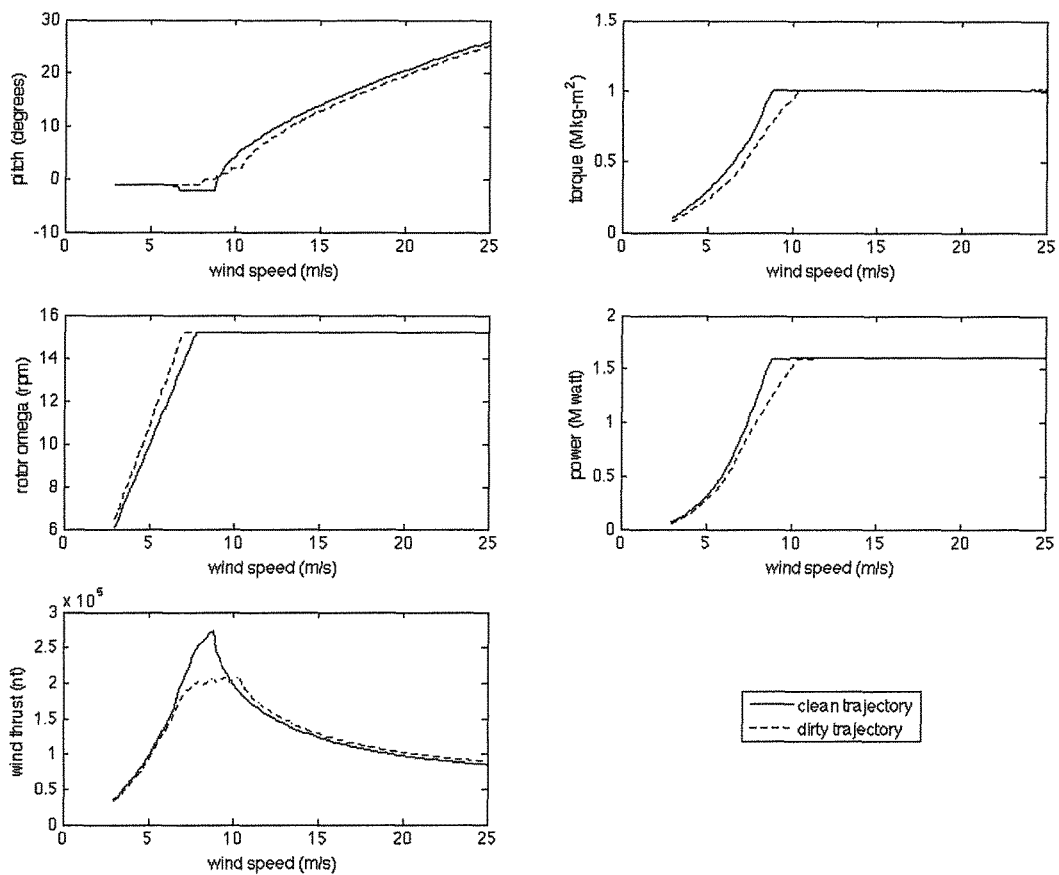
FIG. 3 shows the optimized pitch, torque and rotation speed of an exemplary clean wind turbine blade and a dirty wind turbine blade respectively.

FIG. 3 shows the optimized pitch angle, generator torque, and rotation speed for maximum power production as the function of the wind speed of an exemplary 1.6 MW wind turbine. A first graph (solid lines) shows the optimized values for the normal blade aerodynamics, e.g., a clean wind turbine blade. A second graph (dotted lines) shows the optimized values for the degraded blade aerodynamics, e.g., a dirty wind turbine blade.

As indicated in the graphs of FIG. 3, the degraded wind turbine produces less power and experiences less thrust on the rotor than the normal wind turbine at wind speeds below the rated wind speed. In this region, the degraded wind turbine is operated at a higher rotation speed, a lower torque and a lower pitch angle compared to the normal wind turbine.

Figure 4:
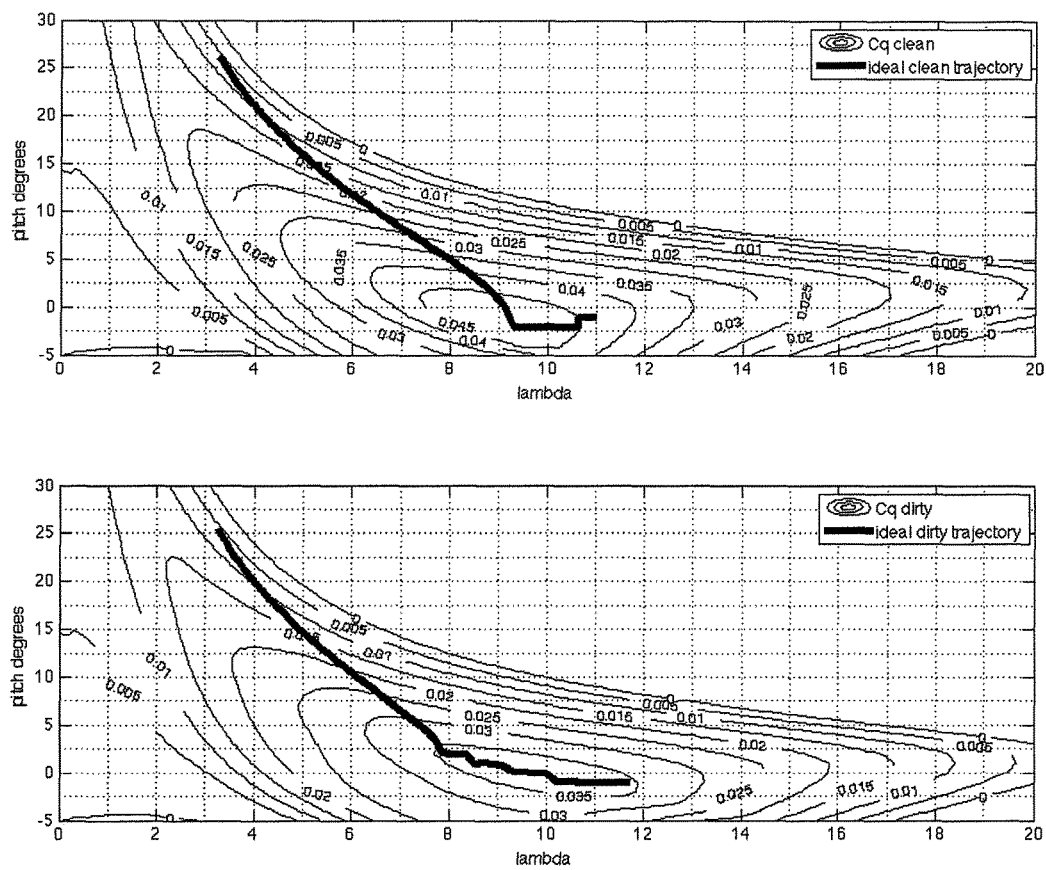
FIG. 4 shows the aerodynamic torque coefficient as function of the pitch angle and the tip speed ratio for the clean and degraded wind turbine blades of FIG. 3.
Figure 5:
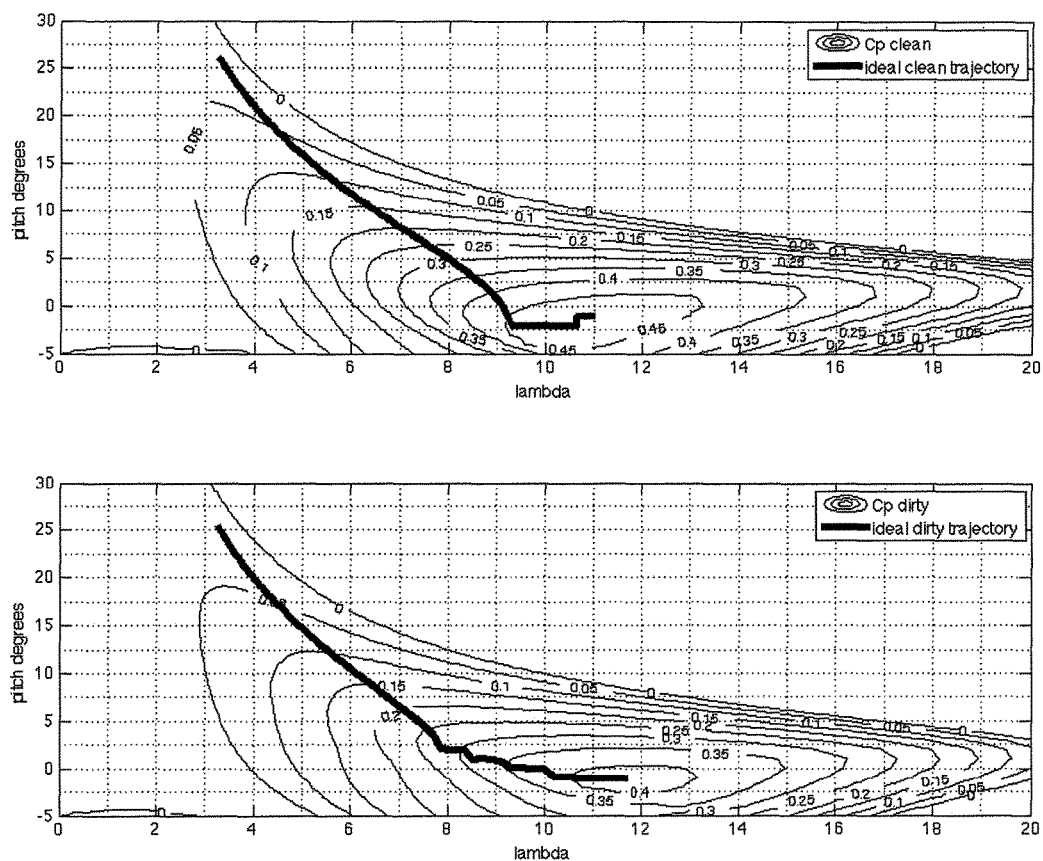
FIG. 5 shows the aerodynamic power coefficient as function of the pitch angle and the tip speed ratio for the clean and degraded wind turbine blades of FIG. 3.

FIG. 4 shows the aerodynamic torque coefficient as function of the pitch angle and the tip speed ratio for the clean and dirty wind turbine blades of FIG. 3. Further, FIG. 5 shows the aerodynamic power coefficient as function of the pitch angle and the tip speed ratio for the clean and dirty wind turbine blades of FIG. 3.

Figure 6:
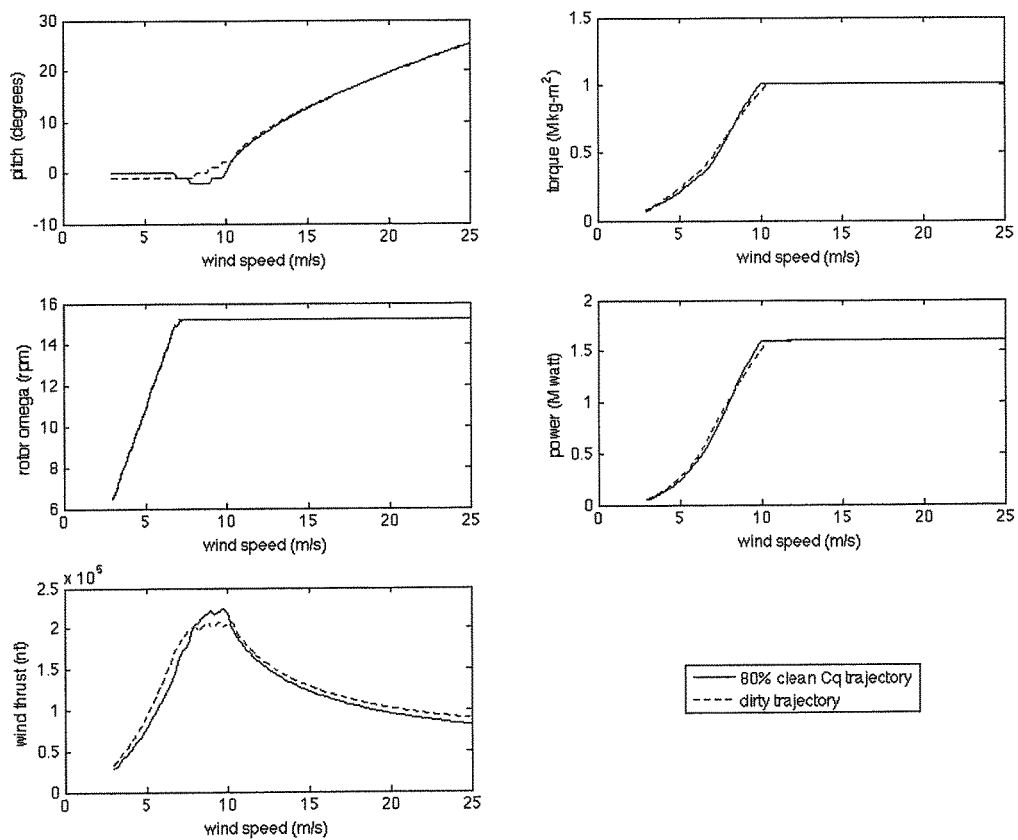
FIG. 6 shows the optimized pitch, torque and rotation speed of the clean wind turbine blade of FIG. 3 scaled to replicate the pitch, torque and rotation speed of the dirty wind turbine blade of FIG. 3 according to a first embodiment.

FIG. 6 shows the adapted pitch angle, generator torque, and rotation speed of the wind turbine optimized for maximum power production according to a first embodiment. In this embodiment, the ideal aerodynamic thrust and the ideal aerodynamic torque of the normal wind turbine of FIG. 3 is scaled by means of a common scaling factor, $k_c$, according to equation (1). Here the ideal aerodynamic thrust and torque coefficients are scaled by means of a factor of $k_c$=0.8, after which the control system adapts the ideal pitch angle, generator torque, and rotation speed according to these scaled aerodynamic coefficients.

Figure 7:
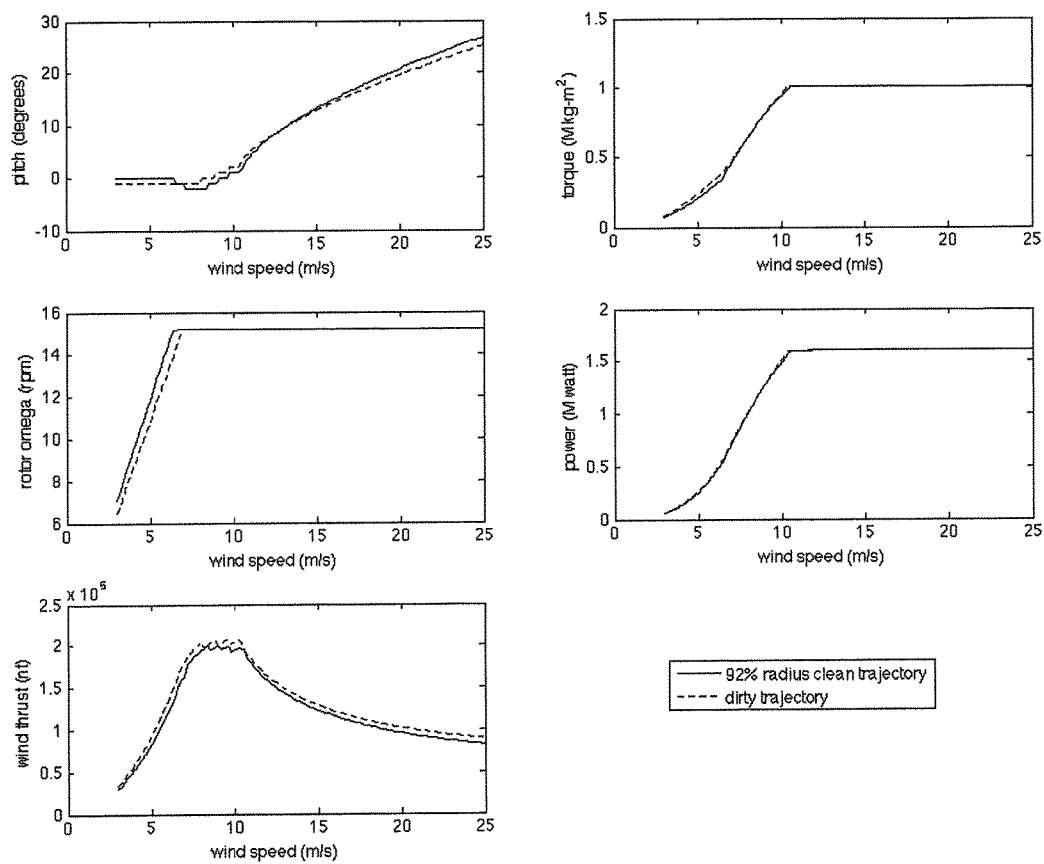
FIG. 7 shows the optimized pitch, torque and rotation speed of the clean wind turbine blade of FIG. 3 scaled to replicate the pitch, torque and rotation speed of the dirty wind turbine blade of FIG. 3 according to a second embodiment.

FIG. 7 shows the adapted pitch angle, generator torque, and rotation speed of the wind turbine optimized for maximum power production according to a second embodiment. In this embodiment, the rotor radius is scaled by means of a scaling factor, $k_R$, to determine a virtual rotor radius which in turn is used to scale the ideal aerodynamic thrust and the ideal aerodynamic torque of the normal wind turbine of FIG. 3 according to equation (2). Here the ideal aerodynamic thrust and torque coefficients are scaled by means of a factor of $k_R$=0.92, after which the control system adapts the ideal pitch angle, generator torque, and rotation speed according to these scaled aerodynamic coefficients.

As illustrated in the graphs of FIGS. 6 and 7, these adapted values (solid lines) provide a more accurate representation of those (dotted lines) of the degraded wind turbine of FIG. 3. This allows the degraded wind turbine to increase the thrust acting on the rotor and thus maximize the power production during the progressive degradation of the blade aerodynamics.

Figure 8:
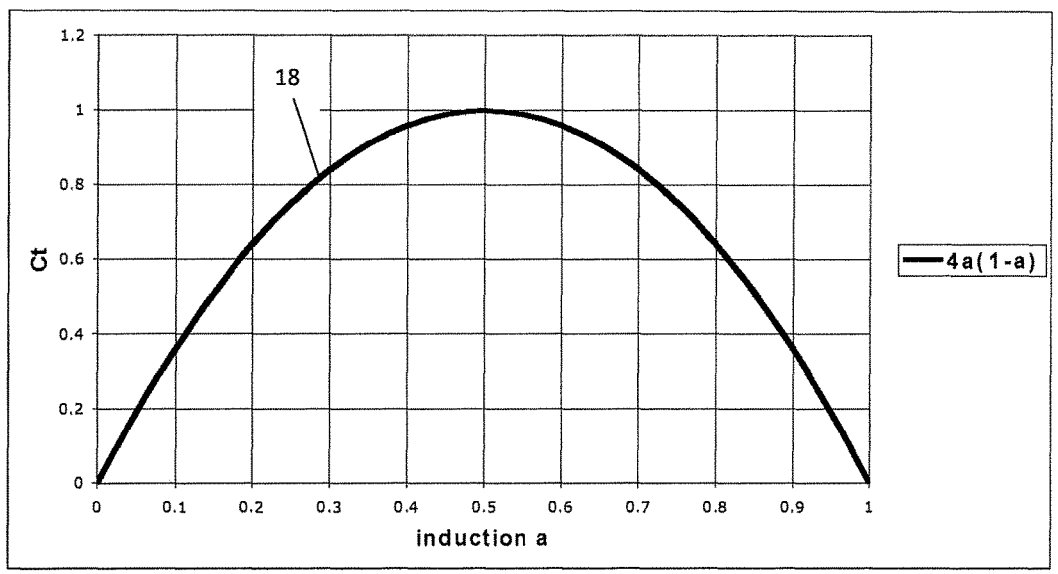
FIG. 8 shows a graph of the aerodynamic thrust coefficient as function of the induction factor.

FIG. 8 shows a graph 18 of the aerodynamic thrust coefficient as function of the induction factor for the normal wind turbine of FIG. 3. As shown in the graph of FIG. 8, this function forms a parabolic function in which two different input values of a provide the same output value of $C_t$.

Figure 9:
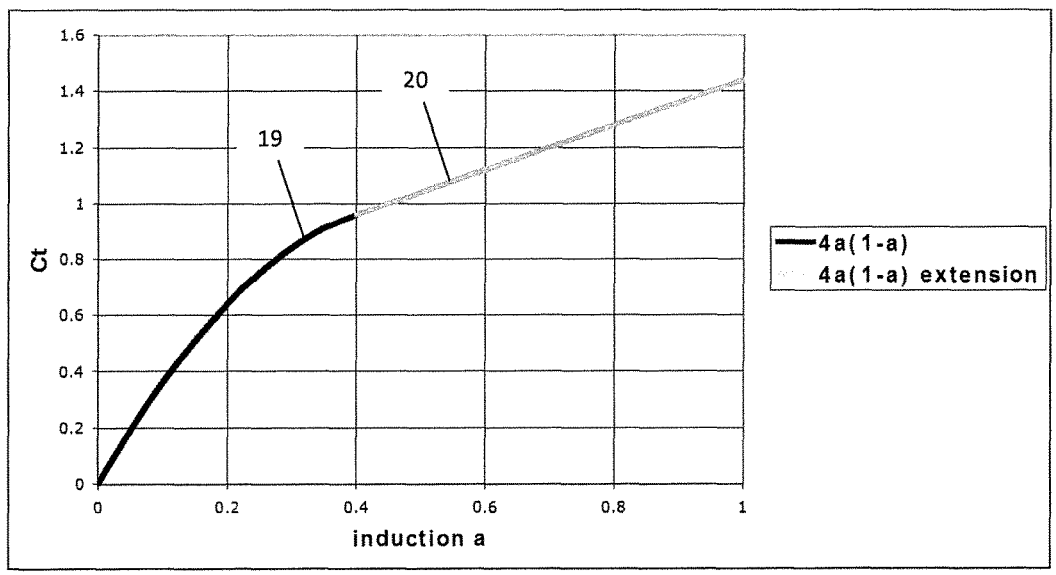
FIG. 9 shows a modified graph of the aerodynamic thrust coefficient of FIG. 8 as function of the induction factor according to a piecewise function.

FIG. 9 shows a modified graph 18' of the aerodynamic thrust coefficient shown in FIG. 8 according to a piecewise function. In this embodiment, the aerodynamic thrust coefficient is defined by a first line segment 19 and a second line segment 20. The first line segment 19 corresponds to that of FIG. 8 while the second line segment 20 is a tangential line to the line of FIG. 8 at a predetermined point, e.g., 0.4. This provides a monotonic function for which one input value of a provides one output value of $C_t$.

Figure 10:
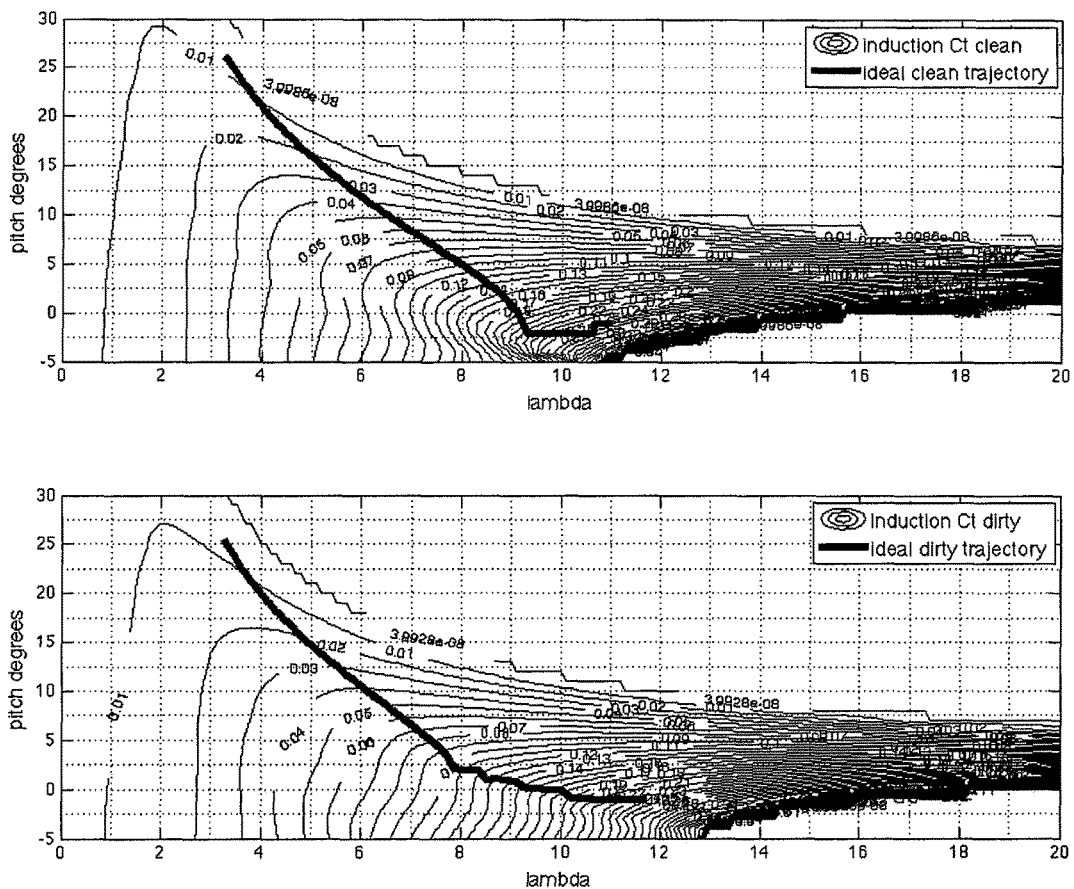
FIG. 10 shows the aerodynamic thrust coefficient as function of the pitch angle and the tip speed ratio for the clean wind turbine blade and the dirty wind turbine blade of FIG. 3.

FIG. 10 shows the aerodynamic thrust coefficient as function of the pitch angle and the tip speed ratio for the normal and degraded wind turbine blades of FIG. 3. The piecewise function shown in FIG. 9 is used to determine the aerodynamic thrust coefficient shown in the graphs of FIG. 10. These two aerodynamic thrust coefficients are then used to determine a ratio indicative of the relationship between the ideal induction factor, e.g., for the clean wind turbine blade, and the degraded induction factor, e.g., for the degraded wind turbine blade.

Figure 11:
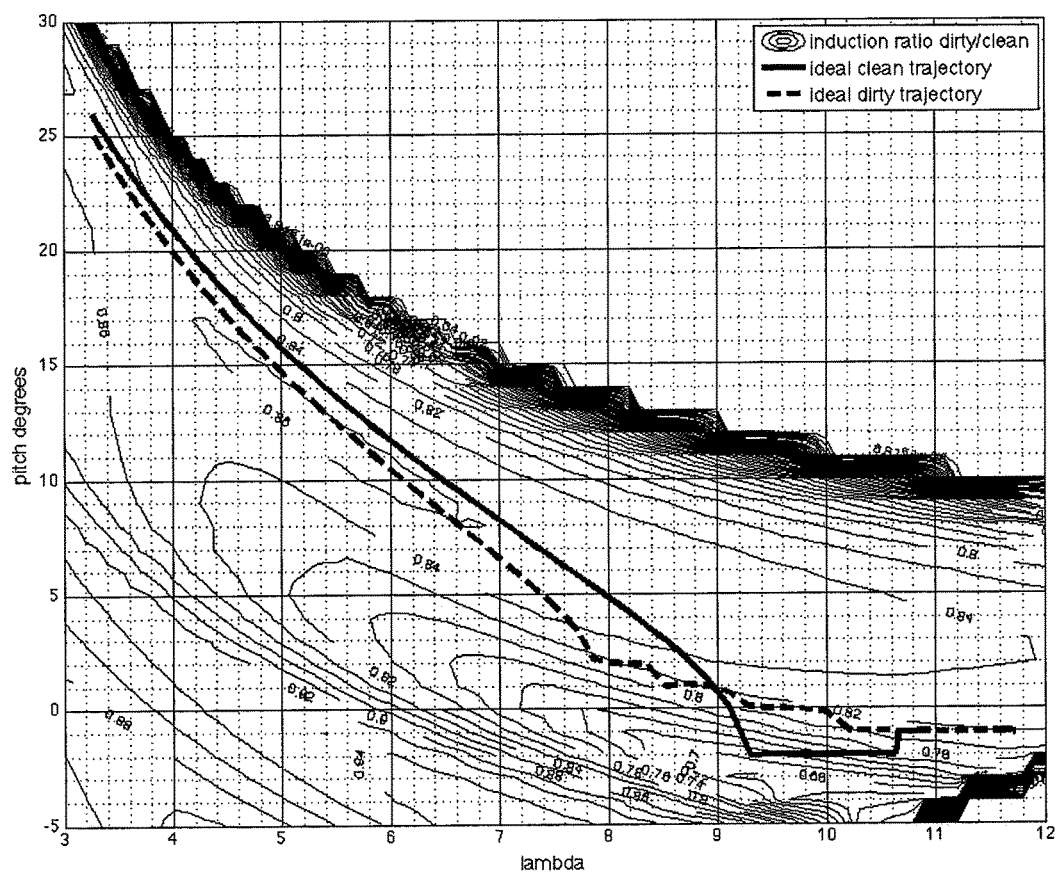
FIG. 11 shows the ratio of the thrust coefficient for the clean wind turbine blade to the thrust coefficient for the dirty wind turbine blade of FIG. 3 as function of the pitch angle and the tip speed ratio.

FIG. 11 shows the ratio of the thrust coefficient for the clean wind turbine blade to the thrust coefficient for the degraded wind turbine blade of FIG. 3 as function of the pitch angle and the tip speed ratio. The ratio shown in FIG. 11 is used to determine a scaling factor, $k_a$, according to one or more criteria.

As indicated in the graph of FIG. 11, the ratio has a range of about 0.7 to about 0.84. As the wind speeds increase from the cut-in wind speed towards the cut-out wind speed, the ratio is also increased from the lower end value towards the upper end value.

Figure 12:
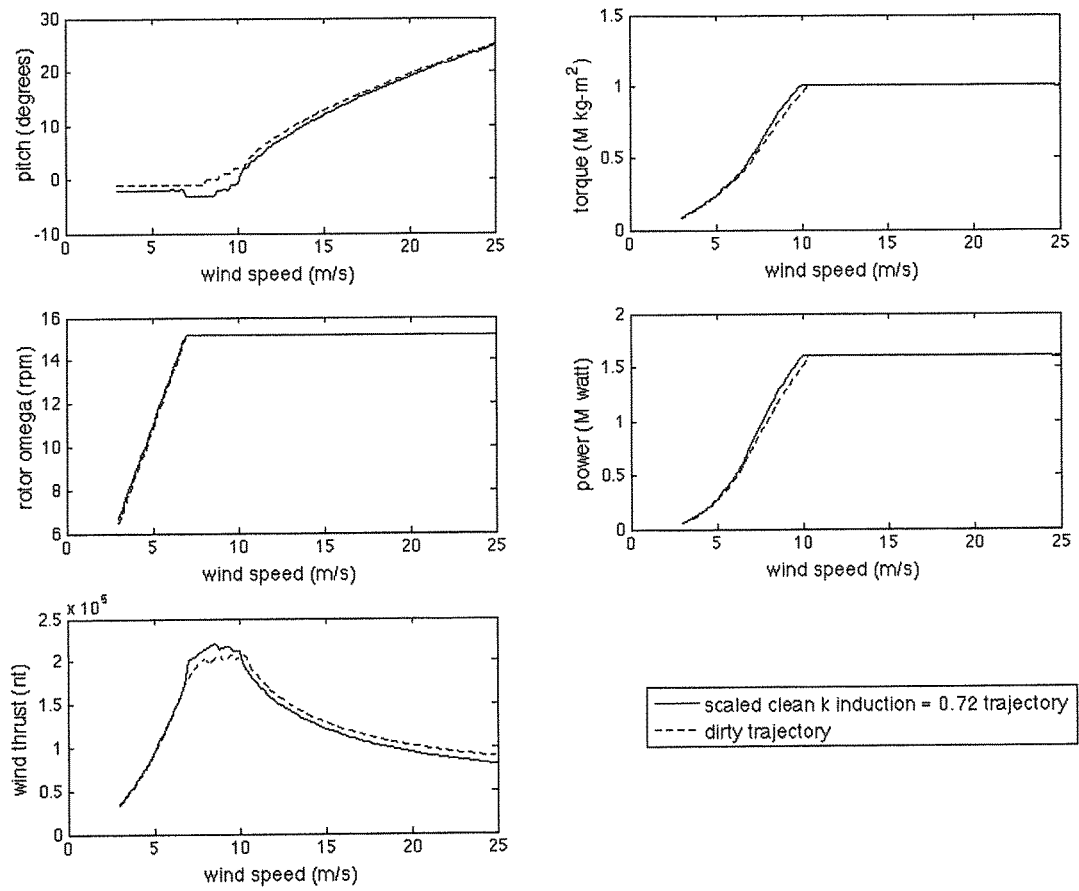
FIG. 12 shows the optimized pitch, torque and rotation speed of the clean wind turbine blade of FIG. 3 scaled to replicate the pitch, torque and rotation speed of the dirty wind turbine blade of FIG. 3 according to a third embodiment.

FIG. 12 shows the adapted pitch angle, generator torque, and rotation speed of the wind turbine optimized for maximum power production according to a third embodiment. In this embodiment, a scaling factor, $k_a$, is determined based on the ratio shown in FIG. 11 according to one or more criteria. The ideal induction factor of the normal wind turbine of FIG. 3 is scaled by means of this scaling factor which in turn is used to scale the aerodynamic coefficients.

The ideal aerodynamic torque coefficient of the normal wind turbine of FIG. 3 is scaled according to equation (4) using the induction factor of FIG. 9 and this scaling factor, $k_a$. Here the ideal aerodynamic torque coefficient is scaled by means of a factor of $k_a$=0.72.

As illustrated in FIG. 12, these adapted values (solid lines) provide a more accurate representation of those (dotted lines) of the degraded wind turbine of FIG. 3. Furthermore, scaling the ideal aerodynamic coefficients using equation (3) means that the actual aerodynamic properties of the degraded wind turbine of FIG. 3 can be replicated with greater accuracy compared to the adapted and optimized values of FIG. 6.

Figure 13:
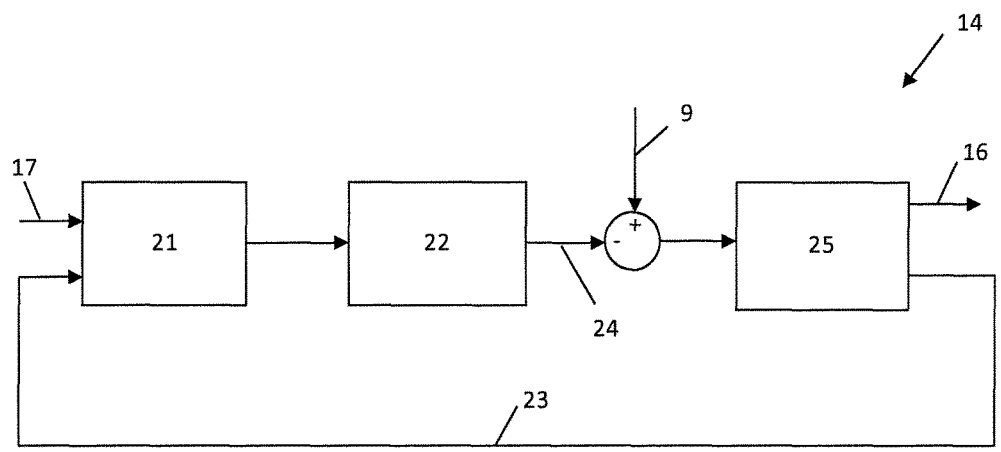
FIG. 13 shows a block diagram of an exemplary first embodiment of the scale factor estimator of FIGS. 1 and 2.

FIG. 13 shows a block diagram of an exemplary first embodiment of the scale factor estimator module 14. In this embodiment, the estimator module 14 comprises a first mathematical model 21 and a second mathematical model 22. The first and second models 21, 22 define a state-space representation of the wind turbine control system. A current set of control signals 17 is used as a control vector and a current set of measurements 23, e.g., the operating parameters, is used as a state vector in the first model 21. The first model 21 predicts a next state of the wind turbine control system based on this control vector and state vector. The second model 22 then translate this predicted state into a predicted next set of measurements 24.

A new set of measurements 9 is then carried out at the next time period. The predicted set of measurements 24 for that time period is transmitted to a comparator along with this new set of measurements 9 for determining the deviation between these two sets of measurements 9, 24. A corrector 25 determines a gain for correcting the prediction based on this deviation which is transmitted back to the first model 21. The first model 21 then uses this gain to correct the next predicted state.

Finally, the estimator module 14 calculates the scaling factor 16 based on the measured sets of operating parameters 9 according to one of equations (1), (2), (3) or (4) as described above. The process is then repeated at the next time period.

Figure 14:
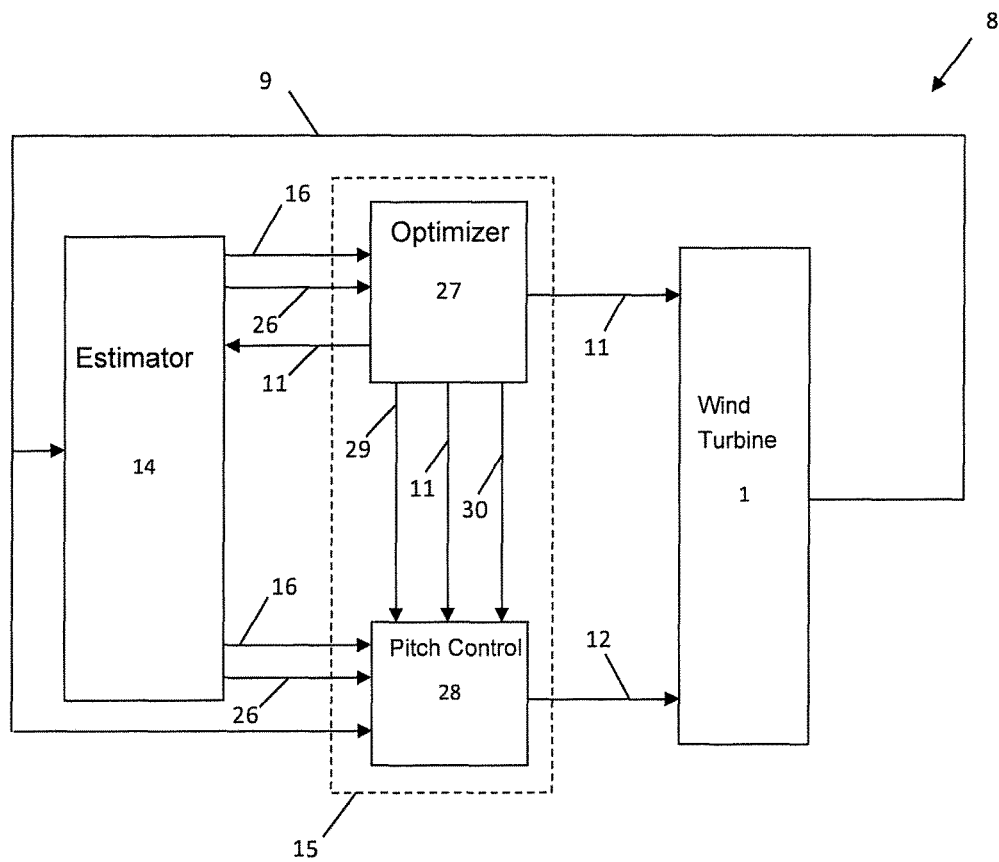
FIG. 14 shows a block diagram of an exemplary first embodiment of the control system of FIGS. 1 and 2.

FIG. 14 shows a block diagram of an exemplary first embodiment of the control system 8. In this embodiment, the estimator module 14 of FIG. 13 further determines an estimated wind speed 26 acting uniformly on the rotor. The scaling factor 16 and the wind speed 26 are transmitted to the control module 15.

The control module 15 comprises an operating point optimizer 27 and a pitch controller 28. The operating point optimizer 27 is configured to scale the ideal aerodynamic torque coefficient of the normal wind turbine based on the received scaling factor 16. The operating point optimizer 27 further adapts the values for maximum power production of these control signals 17 based on this scaled aerodynamic coefficient. These adapted control signals 17 may include a pitch control signal 29, a generator torque control signal 11, and a rotational speed control signal 30. The pitch controller 28 uses these control signals 11, 29, 30 as a reference point for controlling the pitching of the wind turbine blades 3. The pitch controller 28 determines a pitch control signal 12 based on the wind speed 26, the scaling factor 16 and optionally the current rotational speed.

Figure 15:
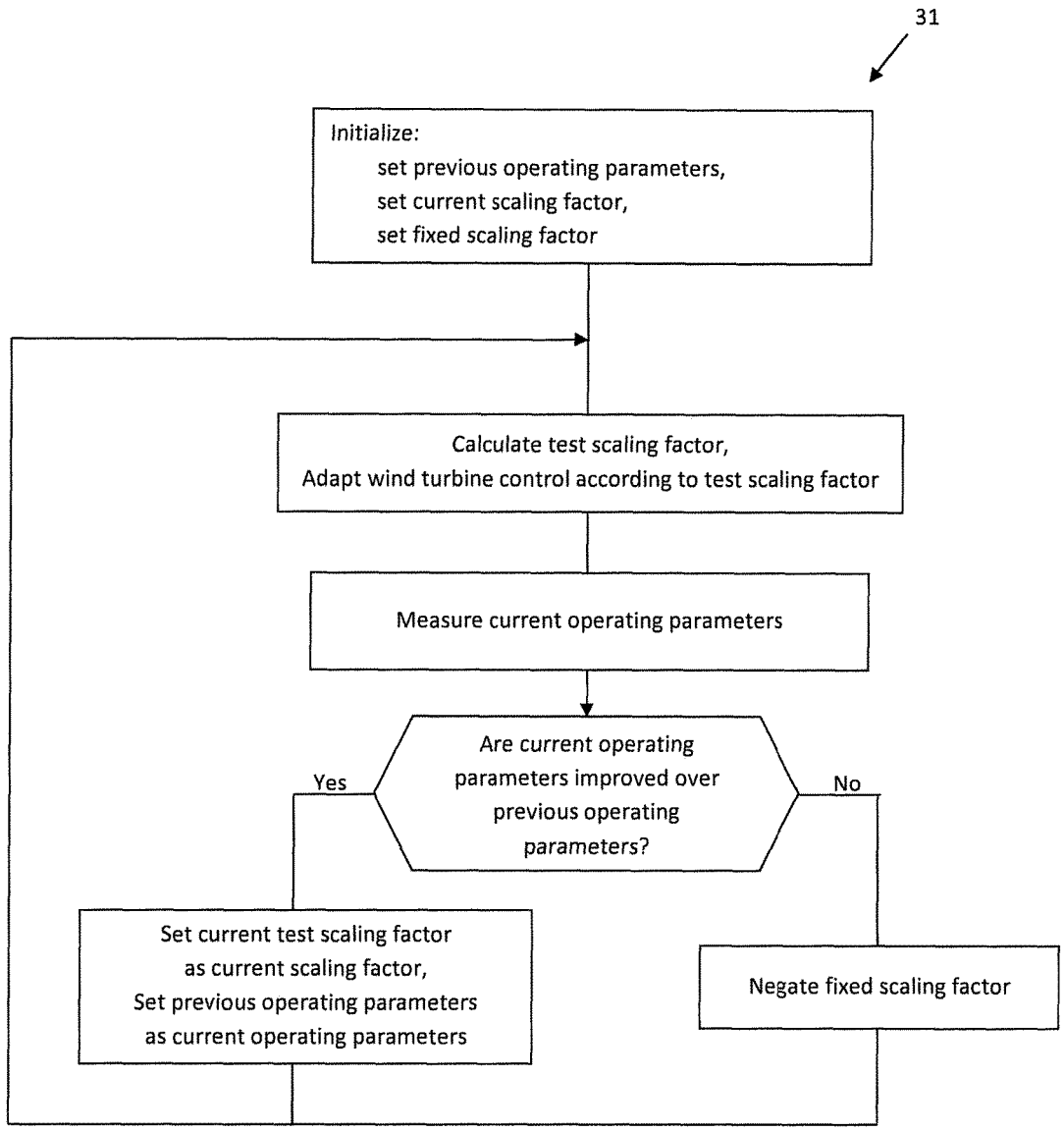
FIG. 15 shows a block diagram of an exemplary second embodiment of the control system of FIGS. 1 and 2.

FIG. 15 shows a block diagram of an exemplary second embodiment of the control system 8. Initially, a fixed scaling factor and a current scaling factor are loaded into the estimator module 14. A previous set of measured operating parameters is loaded into the control module.

The estimator module then calculates a test scaling factor by adding the fixed scaling factor to the current scaling factor. This test scaling factor is then transmitted to the control module which scales the aerodynamic coefficients as described above and determines the optimal control signals based on these scaled aerodynamic coefficients. A new set of operating parameters are then measured and transmitted to the control module. The control module analyses the currently measured set of operating parameters relative to the previously measured set of operating parameters to determine if an improvement is detected in at least one of the operating parameters. If no improvement is detected, then the fixed scaling factor is negated while the current test scaling factor is not changed. If an improvement is detected, then the test scaling factor is saved as the current scaling factor and the current set of operating parameters is saved as the previous set of operating parameters. Finally, the process is repeated.

The present invention is not limited to the illustrated embodiment or the described embodiments herein, and may be modified or adapted without departing from the scope of the present invention as described in the patent claims below.

What is claimed is:

1. A method for controlling the operation of a wind turbine having at least two pitchable wind turbine blades rotary connected to an electrical generator, the method comprising the steps of:
   operating the wind turbine to produce an electrical power output by means of one or more control signals,
   measuring one or more operating parameters of the wind turbine,
   determining a degradation value based on the measured one or more operating parameters, where the degradation value is indicative of the aerodynamic degradation of the wind turbine blades,
   adapting the operation of the wind turbine for maximizing the power output by adjusting at least one of the control signals based on the degradation value, wherein said adjusting at least one of the control signals comprises scaling at least one control parameter based on a scaling factor defining the degradation value, where the at least one control parameter is indicative of the aerodynamic properties of the wind turbine blades in an undegraded state.

2. A method according to claim 1, wherein the control parameter is selected from at least one of the following:
   an aerodynamic power coefficient,
   an aerodynamic thrust coefficient,
   an aerodynamic torque coefficient,
   an aerodynamic induction factor, and
   a radius of the rotor.

3. A method according to claim 2, wherein at least two of the aerodynamic power coefficient, aerodynamic thrust coefficient and the aerodynamic torque coefficient are scaled based on a common scaling factor.

4. A method according to claim 1, wherein the method further comprises the step of estimating a wind speed acting uniformly on the wind turbine blades.

5. A method according to claim 1, wherein the step of adapting the operation of the wind turbine comprises adapting at least a pitch control signal or a generator torque control signal based on at least one of the estimated wind speed or the degradation value.

6. A method according to claim 1, wherein the step of determining the degradation value comprises predicting a first set of operating parameters based on a current set of control signals and at least a second set of operating parameters.

7. A method according to claim 6, wherein the step of determining the degradation value further comprises determining the deviation between the current measured set of operating parameters and the first set of operating parameters, and correcting a subsequent third set of operating parameters based on this deviation.

8. A method according to claim 1, wherein the method comprises the steps of:

calculating a test scaling factor by adding a first scaling factor to a second scaling factor, scaling the at least one control parameter based on the test scaling factor, measuring a first set of operating parameters, evaluating the first set of operating parameters by comparing it to a second set of operating parameters to detect whether or not at least one of the control parameters in the first set has an improved value over the corresponding control parameter in the second set, and if an improvement is detected, then saving the test scaling factor as the second scaling factor, or if no improvement is detected, then negating the value of the first scaling factor.

9. A wind turbine comprising a wind turbine tower, an electrical generator arranged on top of the wind turbine tower, a rotor with at least two wind turbine blades rotatably connected to the generator, and a control system configured to control the operation of the wind turbine based on one or more control signals, where the control system is configured to determine a degradation value indicative of the aerodynamic degradation of the wind turbine blades and to adapt the operation of the wind turbine based on this degradation value, wherein the degradation value is a scaling factor and the control system is configured to scale at least one control parameter indicative of the aerodynamic properties of the wind turbine blades in an undegraded state based on this scaling factor.

10. A wind turbine according to claim 9, wherein the control system comprises an estimator module configured to predict a first set of operating parameters based on a current set of control signals and at least a second set of operating parameters.

11. A wind turbine according to claim 10, wherein the estimator module is further configured to correct a subsequent third set of operating parameters based on a deviation between a current measured set of operating parameters and the first set of operating parameters.

12. A wind turbine according to claim 9, wherein the control system comprises an estimator module configured to calculate a test scaling factor by adding a first scaling factor to a second scaling factor, wherein the control system is further configured to evaluate a first set of operating parameters relative to a second set of operating parameters to detect whether at least one of the control parameters in the first set has an improved value over the corresponding control parameter in the second set or not.

13. A wind turbine according to claim 9, wherein at least one sensor unit is arranged relative to the wind turbine, wherein the at least one sensor unit is configured to directly or indirectly measure acceleration of the wind turbine tower.

14. A wind turbine according to claim 13, wherein the at least one sensor unit is a position sensor or a tilt sensor.

15. A wind turbine system comprising one or more wind turbines, wherein each wind turbine comprises a local control system configured to control the operation of that wind turbine, where each local control system is configured to communicate remotely with a remote control system, wherein the remote control system is configured to adapt the operation of at least one of the one or more wind turbines based on one or more control signals, where said remote control system is configured to determine a degradation value indicative of the aerodynamic degradation of the wind turbine blades and to adapt the operation of the wind turbine based on this degradation value, wherein the degradation value is a scaling factor and said remote control system is configured to scale at least one control parameter indicative of the aerodynamic properties of the wind turbine blades in an undegraded state based on this scaling factor.

* * * * *